(12) United States Patent
Bongard et al.

(10) Patent No.: US 10,337,598 B2
(45) Date of Patent: Jul. 2, 2019

(54) LIMITED SLIP DIFFERENTIAL

(71) Applicant: ARB CORPORATION LIMITED, Kilsyth, Victoria (AU)

(72) Inventors: Daniel Jason Bongard, Kilsyth (AU); Andrew Harry Brown, Kilsyth (AU)

(73) Assignee: ARB CORPORATION LIMITED, Kilsyth, Victoria (AU)

( * ) Notice: Subject to any disclaimer, the term of this patent is extended or adjusted under 35 U.S.C. 154(b) by 276 days.

(21) Appl. No.: 15/319,598

(22) PCT Filed: Jun. 18, 2015

(86) PCT No.: PCT/AU2015/050341
§ 371 (c)(1),
(2) Date: Dec. 16, 2016

(87) PCT Pub. No.: WO2015/192185
PCT Pub. Date: Dec. 23, 2015

(65) Prior Publication Data
US 2017/0122423 A1 May 4, 2017

(30) Foreign Application Priority Data

Jun. 18, 2014 (AU) ................................ 2014902327

(51) Int. Cl.
*F16H 48/22* (2006.01)
*F16H 57/04* (2010.01)
(Continued)

(52) U.S. Cl.
CPC ............ *F16H 48/22* (2013.01); *F16D 13/52* (2013.01); *F16D 13/648* (2013.01); *F16D 13/74* (2013.01);
(Continued)

(58) Field of Classification Search
CPC .. F16H 48/22; F16H 57/0473; F16H 57/0483; F16H 48/40; F16H 57/043; F16D 13/74; F16D 25/123; F16D 13/648
See application file for complete search history.

(56) References Cited

U.S. PATENT DOCUMENTS 3,198,295 A * 8/1965 Fangman ............... F16D 13/648
188/152
3,463,281 A * 8/1969 Aschauer ................ F16D 13/72
188/264 E (Continued)

FOREIGN PATENT DOCUMENTS

| CN | 1274813 A | 11/2000 |
|---|---|---|
| CN | 203239898 U | 10/2013 |
| GB | 1213760 | 11/1970 |

OTHER PUBLICATIONS

International Preliminary Report on Patentability dated Jun. 27, 2016 in corresponding International Application No. PCT/AU2015/050341, 10pp.

(Continued)

*Primary Examiner* — Sherry L Estremsky
(74) *Attorney, Agent, or Firm* — Lewis Roca Rothgerber Christie LLP

(57) ABSTRACT

A limited slip differential for a vehicle comprising: a carrier containing lubricant and rotatable about a first axis; a pinion gear arranged within the carrier and rotatable about a second axis; a side gear arranged within the carrier and engaged with the pinion gear; and a clutch pack arranged within the carrier and rotatable about the first axis, the clutch pack comprising a captive disk and a floating disk, each of the captive disk and the floating disk have a central aperture, a peripheral region, and at least one lubrication aperture, the captive disk having an inner lubrication aperture arranged proximal to the respective central aperture and an outer (Continued)

lubrication aperture arranged proximal to the respective peripheral region, and the floating disk having an intermediate lubrication aperture arranged between the inner aperture and the outer aperture, whereby rotation of the floating disk relative to the captive disk causes lubricant to travel from the central apertures to the peripheral regions by progressively passing from the inner lubrication aperture to the intermediate lubrication aperture, and to the outer lubrication aperture.

23 Claims, 11 Drawing Sheets

(51) Int. Cl.
  *F16D 13/52* (2006.01)
  *F16D 13/64* (2006.01)
  *F16D 25/08* (2006.01)
  *F16D 25/12* (2006.01)
  *F16D 13/74* (2006.01)
  *F16H 48/40* (2012.01)

(52) U.S. Cl.
  CPC ......... *F16D 25/082* (2013.01); *F16D 25/123* (2013.01); *F16H 48/40* (2013.01); *F16H 57/043* (2013.01); *F16H 57/0457* (2013.01); *F16H 57/0473* (2013.01); *F16H 57/0483* (2013.01); *F16D 2300/0214* (2013.01); *F16H 57/04* (2013.01)

(56) References Cited

U.S. PATENT DOCUMENTS

| | | | |
|---|---|---|---|
| 4,516,443 A | 5/1985 | Hamano et al. | |
| 4,667,534 A * | 5/1987 | Kataoka | F16H 48/22 192/107 R |
| 5,007,885 A | 4/1991 | Yamamoto et al. | |
| 5,093,057 A | 3/1992 | Hara et al. | |
| 5,827,145 A * | 10/1998 | Okcuoglu | F16H 48/08 475/88 |
| 6,379,277 B1 | 4/2002 | Victoria et al. | |
| 6,712,190 B2 * | 3/2004 | Kitaori | F16D 13/648 188/264 B |
| 7,445,088 B2 * | 11/2008 | Watanabe | F16H 57/0427 184/13.1 |
| 2010/0184552 A1 | 7/2010 | Soybel et al. | |
| 2010/0304914 A1 | 12/2010 | Barrett et al. | |
| 2013/0186727 A1 | 7/2013 | Ando et al. | |
| 2015/0369302 A1* | 12/2015 | Takabayashi | F16D 13/52 192/70.12 |

OTHER PUBLICATIONS

International Search Report dated Aug. 10, 2015 in corresponding International Application No. PCT/AU2015/050341, 9pp.
Written Opinion dated Aug. 10, 2015 in corresponding International Application No. PCT/AU2015/050341, 8pp.
Written Opinion dated May 12, 2016 in corresponding International Application No. PCT/AU2015/050341, 10pp.

* cited by examiner

LIMITED SLIP DIFFERENTIAL

CROSS-REFERENCE TO RELATED APPLICATIONS

This application is a national phase application under 35 U.S.C. 371 of International Application No. PCT/AU2015/050341, filed on 18 Jun. 2015, which claims the benefit of Australian Provisional Patent Application no. 2014902327, filed on 18 Jun. 2014, the disclosures of which are incorporated herein by reference in their entirety.

TECHNICAL FIELD

The present disclosure relates generally to limited slip differentials and relates particularly to a locking limited slip differential for a vehicle.

BACKGROUND

In order to enhance off-road driving performance of a four-wheel drive vehicle, it is common to install a 'limited slip' differential, instead of a conventional 'open' differential, between two respective wheel-axle shafts. The limited slip differential mechanically limits relative rotation of the wheel-axle shafts according to a defined bias, therefore allowing up to a pre-determined difference in wheel speed. This proves useful when the vehicle is driven across loose or uneven road conditions where one of the wheels is unable to maintain grip, for example, by coming into contact with ice, causing friction to decrease and the wheel to spin. When this occurs, the limited slip differential diverts useful torque away from the wheel-axle connected to the spinning wheel, to the opposite wheel-axle, provided there is some friction between the connected wheel and the ground. This allows the opposite wheel to grip and propel the vehicle over the problematic road condition. However, as limited slip differentials allow some relative rotation of the wheel-axle shafts, there are occasions where the diverted torque is not sufficient for the opposite wheel to grip and negotiate the problematic road condition, which can cause the driver to lose control of the vehicle.

In order to further enhance the off-road driving performance of a four-wheel drive vehicle, it is common to install a 'locking' differential between two respective wheel-axle shafts. The locking differential allows the wheel-axle shafts to be operatively 'locked' and effectively act as a single shaft, thereby preventing relative rotation of the wheel-axle shafts and eliminating difference in wheel speed. This is particularly useful when road conditions are very loose and the wheels are unlikely to be able to maintain grip. By preventing relative rotation of the wheel axles, traction is significantly increased, allowing the vehicle to traverse the loose road conditions.

One drawback to locking differentials is the decrease in vehicle handling performance. When a locking differential is operated, it often proves difficult to steer the vehicle, as negotiating a turn typically requires one wheel to rotate faster than the other, and therefore the differential is typically deactivated prior to turning. However, if the locking differential is deactivated whilst turning across loose road conditions, meaning that the differential reverts to behaving as an 'open' differential, this can result in a significant decrease in traction and potentially cause the driver to lose control of the vehicle.

It would be useful to provide a combination of a locking and limited slip differential, to provide optimum traction during all driving conditions. One example of such a differential is disclosed in U.S. Pat. No. 5,865,701. The disclosed locking limited slip differential uses a 'clutch pack' comprising a stack of friction disks (as typically found in limited slip differentials) to limit relative rotation of a pair of wheel-axles or alternatively, to prevent relative rotation altogether. However, whilst this differential may function adequately, it is foreseeable that the differential also has a number of drawbacks. For example, as the mechanism for 'locking' the wheel-axles is a conventional clutch pack and the torque values typically involved in locking wheel-axles of four-wheel drive vehicles are much higher than those involved in limiting slip between wheel-axles (torque is in the order of 1000 Nm for locking compared to around 100-200 Nm for limiting slip), this is likely to result in significantly greater friction forces and heat energy being generated in the clutch pack, therefore causing greater wear and likely decreasing the useful life of the differential.

Accordingly, it would be advantageous to provide a locking limited slip differential which is less prone to damage during locking operations and therefore more durable than prior art approaches. Furthermore, it would be useful to provide a solution that avoids or ameliorates any of the disadvantages present in the prior art, or which provides another alternative to the prior art approaches.

Any discussion of documents, acts, materials, devices, articles or the like included in the present specification is not to be taken as an admission that any or all of these matters form part of the common general knowledge in the field relevant to the present disclosure as it existed before the priority date of each claim of this application.

SUMMARY

According to one aspect of the present disclosure there is provided a limited slip differential for a vehicle comprising a carrier at least partially filled with a lubricant and rotatable about a first axis, a pinion gear arranged within the carrier and rotatable about a second axis arranged perpendicular to the first axis, a side gear arranged within the carrier and rotatable about the first axis, the side gear engaged with the pinion gear, and a clutch pack arranged within the carrier and rotatable about the first axis, the clutch pack comprising a captive disk engaged with the carrier, and a floating disk arranged adjacent the captive disk and engaged with the side gear, each of the captive disk and the floating disk having a central region, a peripheral region, and defining at least one lubrication aperture for containing a volume of the lubricant, wherein one of the captive and the floating disk has a first face defining a first lubrication aperture proximal to the central region, and defining a second lubrication aperture spaced radially apart from the first lubrication aperture and proximal to the peripheral region, and wherein the other disk has a second face arranged opposite the first face, the second face having notional profiles projected thereon corresponding with the first lubrication aperture and the second lubrication aperture positions, and defining an intermediate lubrication aperture spaced radially apart from the central region between the notional profiles, and wherein a first notional circle arranged on the second face concentric with the central region and tangential with the intermediate aperture intersects the first lubrication aperture notional profile, and a second notional concentric circle arranged tangential with the intermediate aperture intersects the second lubrication aperture notional profile, and wherein during rotation of the disks relative to each other the intermediate lubrication aperture rotates past and partially overlaps the first lubrication aperture, causing a volume of the lubricant contained in the first lubrication aperture to move into the intermediate lubrication aperture, and the intermediate lubrication aperture rotates past and partially overlaps the second lubrication aperture, causing the volume of the lubricant contained in the intermediate lubrication aperture to move into the second lubrication aperture, thereby causing the lubricant to travel progressively from the central regions towards the peripheral regions via each of the lubrication apertures.

According to another aspect of the disclosure there is provided a limited slip differential for a vehicle comprising a carrier at least partially submerged in a lubricant and rotatable about a first axis in a first direction, the carrier having a sidewall extending along the first axis and at least one inlet aperture extending therethrough, the at least one inlet aperture having a centre line arranged at an acute angle relative to a radius extending from the first axis to an intersection of the centre line and the sidewall, a pinion gear arranged within the carrier and rotatable about a second axis arranged perpendicular to the first axis, a side gear arranged within the carrier and rotatable about the first axis, the side gear engaged with the pinion gear, and a clutch pack arranged within the carrier and rotatable about the first axis, wherein the carrier further comprises at least one outlet aperture extending between a region adjacent to and spaced apart from an outer edge of the clutch pack and an area outside of the carrier, wherein rotation of the carrier in the first direction causes the lubricant to be impelled through the at least one inlet aperture towards the first axis, and further causes the lubricant to be expelled through the at least one outlet aperture and away from the first axis.

According to a further aspect of the disclosure there is provided a limited slip differential for a vehicle comprising a carrier at least partially filled with a lubricant and rotatable about a first axis, a pinion gear arranged within the carrier and rotatable about a second axis arranged perpendicular to the first axis, a side gear arranged within the carrier and rotatable about the first axis, the side gear engaged with the pinion gear, a clutch pack arranged within the carrier and rotatable about the first axis, the clutch pack comprising a captive disk engaged with the carrier, and a floating disk arranged adjacent the captive disk and engaged with the side gear, and a piston arranged adjacent the clutch pack and having a front surface arranged to abut one of the captive disk and the floating disk, the front surface comprising a deformable membrane configured to conform to a the respective disk, the piston being movable axially along the first axis to press against the clutch pack, whereby operation of the piston increases pressure within the piston, causing the front surface to abut the clutch pack and deform the deformable membrane, thereby evenly applying pressure across the respective disk.

According to a further alternative aspect of the disclosure there is provided a limited slip differential for a vehicle comprising a carrier at least partially filled with a lubricant and rotatable about a first axis, a pinion gear arranged within the carrier and rotatable about a second axis arranged perpendicular to the first axis, a side gear arranged within the carrier and rotatable about the first axis, the side gear engaged with the pinion gear, a clutch pack arranged within the carrier and rotatable about the first axis, the clutch pack comprising a plurality of pairs of lamina disks, each pair of lamina disks comprising a captive lamina disk engaged with the carrier, and a floating lamina disk arranged adjacent the captive lamina disk and engaged with the side gear.

Other aspects are disclosed.

BRIEF DESCRIPTION OF THE DRAWINGS

Embodiments of the disclosed principles will now be described, by way of example only, with reference to the accompanying drawings in which.

DETAILED DESCRIPTION OF PREFERRED EMBODIMENTS

Figure 1:
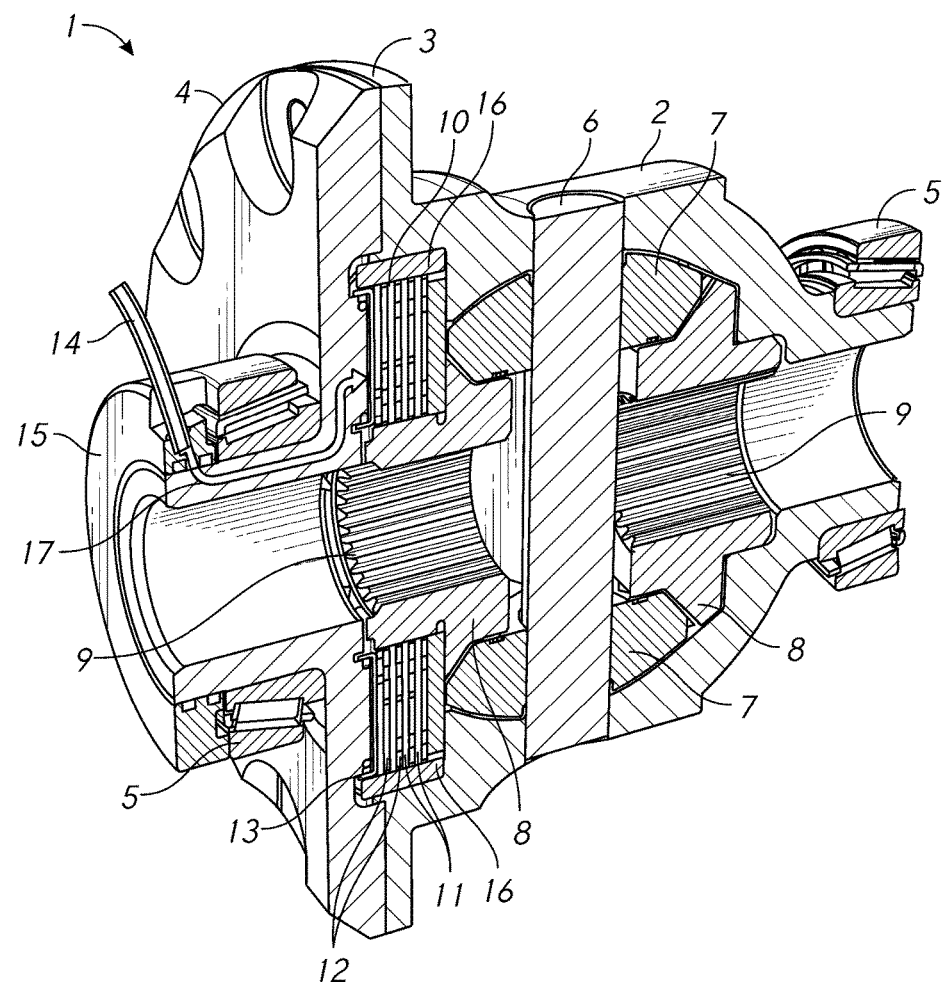
FIG. 1 is a perspective cross-section view of a limited slip differential.

The present disclosure relates to limited slip differentials and particularly relates to a locking limited slip differential for an automotive vehicle.

One aspect relates to a limited slip differential for a vehicle comprising: a carrier at least partially filled with a lubricant and rotatable about a first axis; a pinion gear arranged within the carrier and rotatable about a second axis arranged perpendicular to the first axis; a side gear arranged within the carrier and rotatable about the first axis, the side gear engaged with the pinion gear; and a clutch pack arranged within the carrier and rotatable about the first axis, the clutch pack comprising a captive disk engaged with the carrier, and a floating disk arranged adjacent the captive disk and engaged with the side gear; each of the captive disk and the floating disk having a central aperture, a peripheral region, and at least one lubrication aperture, wherein the captive disk has an inner lubrication aperture arranged proximal to the respective central aperture and an outer lubrication aperture arranged proximal to the respective peripheral region, and the floating disk has an intermediate lubrication aperture arranged between the inner aperture and the outer aperture. In this embodiment, rotation of the floating disk relative to the captive disk causes the lubricant to travel from the central apertures towards the peripheral regions by progressively passing from within the inner lubrication aperture to within the intermediate lubrication aperture, and to within the outer lubrication aperture.

Another aspect relates to a limited slip differential for a vehicle comprising: a carrier at least partially submerged in a lubricant and rotatable about a first axis in a first direction, the carrier having a sidewall extending along the first axis and at least one inlet aperture extending therethrough, the at least one inlet aperture having a centre line arranged at an acute angle relative to a radius extending from the first axis to an intersection of the centre line and the sidewall; a pinion gear arranged within the carrier and rotatable about a second axis arranged perpendicular to the first axis; and a side gear arranged within the carrier and rotatable about the first axis, the side gear engaged with the pinion gear. In this embodiment, rotation of the carrier in the first direction causes the lubricant to be impelled through the at least one inlet aperture towards the first axis.

A further aspect relates to a limited slip differential for a vehicle comprising: a carrier at least partially filled with a lubricant and rotatable about a first axis; a pinion gear arranged within the carrier and rotatable about a second axis arranged perpendicular to the first axis; a side gear arranged within the carrier and rotatable about the first axis, the side gear engaged with the pinion gear; a clutch pack arranged within the carrier and rotatable about the first axis, the clutch pack comprising a captive disk engaged with the carrier, and a floating disk arranged adjacent the captive disk and engaged with the side gear; and a piston arranged adjacent the clutch pack, the piston being movable along the first axis to press against the clutch pack, and wherein at least a portion of the piston is deformable, thereby conforming to a corresponding contact surface of the clutch pack.

An alternative aspect relates to a limited slip differential for a vehicle comprising: a carrier at least partially filled with a lubricant and rotatable about a first axis; a pinion gear arranged within the carrier and rotatable about a second axis arranged perpendicular to the first axis; a side gear arranged within the carrier and rotatable about the first axis, the side gear engaged with the pinion gear; a clutch pack arranged within the carrier and rotatable about the first axis, the clutch pack comprising a plurality of pairs of lamina disks, each pair of lamina disks comprising a captive lamina disk engaged with the carrier, and a floating lamina disk arranged adjacent the captive lamina disk and engaged with the side gear.

In general, the disclosed limited slip differential embodiments are intended to minimise damage to components of the differential caused by friction and heat generated in the differential during use. This is achieved by employing various features of the differential to cause a continuous flow of lubricant through the differential during operation, thereby dissipating heat and removing potentially damaging particulate from within the differential. This is due to one or more of the effects of impelling lubricant into the centre of the differential to form a region of positive pressure lubricant, passing lubricant away from the centre of the differential using a centrifuge effect, and creating a region of negative pressure lubricant at a peripheral region of the differential, causing lubricant to be expelled out of the differential.

Figure 2:
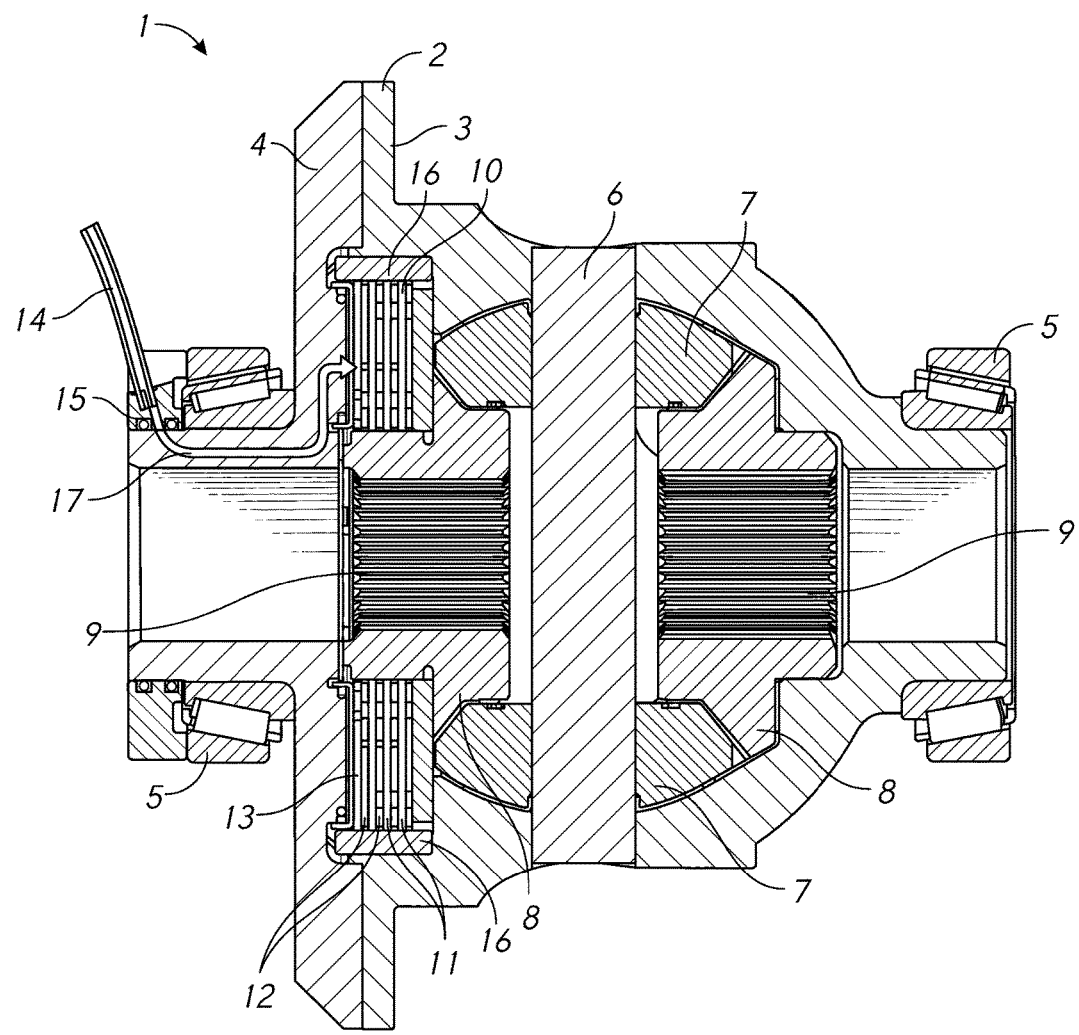
FIG. 2 is a cross-section view of the limited slip differential shown in FIG. 1.

In FIGS. 1 and 2, a limited slip differential 1 is shown in cross-section. The differential 1 comprises a carrier 2, having a casing 3 and a flange 4, rotatable about a common axis and supported thereabout by two support bearings 5. A cross shaft 6 extends substantially perpendicular to the common axis across a cavity within the carrier 2, the cross shaft 6 having two pinion gears 7 rotatably connected thereto. Two side gears 8 are rotatable about the common axis and engaged with the pinion gears 7. Each side gear 8 has a plurality of splines 9 extending therefrom for engaging with a respective wheel-axle shaft (not shown). A clutch pack 10 is arranged adjacent one of the side gears 8 and is rotatable about and slidable along the common axis. The clutch pack 10 comprises a plurality of friction disks 11, 12 arranged in a plurality of pairs of disks 11, 12, each pair comprising a captive disk 11 and a floating disk 12 adjacent one another. Each captive disk 11 is engaged with the carrier 2 via a plurality of spline pins 16 at an outer, peripheral region of the disk 11, and each floating disk 12 is engaged with the adjacent side gear 8 at an inner, peripheral region of the disk 12. A piston 13 is arranged adjacent the clutch pack 10 and is slidable along the common axis. A tube 14 is connected to a supply of pressurised working fluid (not shown), such as oil or air, and in fluid communication with the piston 13 via a seal housing 15 and a fluid path 17.

In use, the carrier 2 is installed in a cavity in a vehicle (not shown) and covered with a housing (not shown), thereby sealing the cavity. The cavity is at least partially filled with a lubricant, such as an oil, to at least partially submerge the carrier 2 in the lubricant. A peripheral region of the carrier casing 3 is connected to a ring gear (not shown) which is engaged with a pinion gear (not shown) connected to a drive shaft (not shown) driven by the vehicle's engine. When the ring gear is driven, the carrier 2 rotates about the common axis, causing the cross shaft 6 and pinion gears 7 to rotate, which in turn rotate the side gears 8 and associated wheel-axle shafts.

In order to operate the clutch pack 10, pressurised working fluid is passed through the tube 14 and fluid path to a rear face of the piston 13, causing the piston 13 to exert force on the clutch pack 10. The force urges the disks 11, 12 in the clutch pack 10 to compress together. As the clutch pack 10 is increasingly compressed, this progressively limits rotation of the captive disks 11 relative to the floating disks 12, consequently limiting rotation of the carrier 2 relative to the side gear 8, until the clutch pack 10 is 'locked', whereby the friction between disks 11, 12 overcomes the torque exerted on the disks 11, 12, causing the carrier 2 and both side gears 8 to rotate at the same speed.

The compression of the clutch pack 10, and therefore the 'bias' of the clutch 10, is dependent on the pressure of the working fluid exerting force on the piston 13. For example, the bias may be set to 25%, which would provide 25% of the friction necessary to lock the clutch 10. This would cause a relatively low pressure working fluid to pass through the fluid path to the piston 13 and affect a proportionally low level of limited slip between the carrier 2 and the side gear 8. Alternatively, the bias may be set to 100%, which would provide 100% of the friction necessary to lock the clutch 10. This would cause a high pressure working fluid to operate the piston 13 and eliminate slip between the carrier 2 and the side gear 8, thereby rotationally locking the carrier 2 and the side gears 8.

Figure 3A:
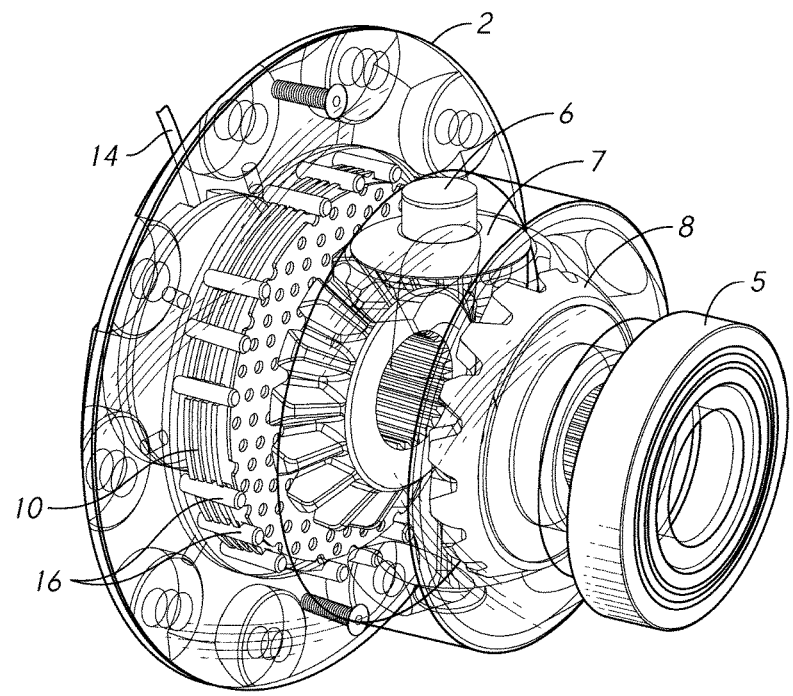
FIGS. 3A and 3B are alternative perspective views of the limited slip differential shown in FIGS. 1 and 2.
Figure 3B:
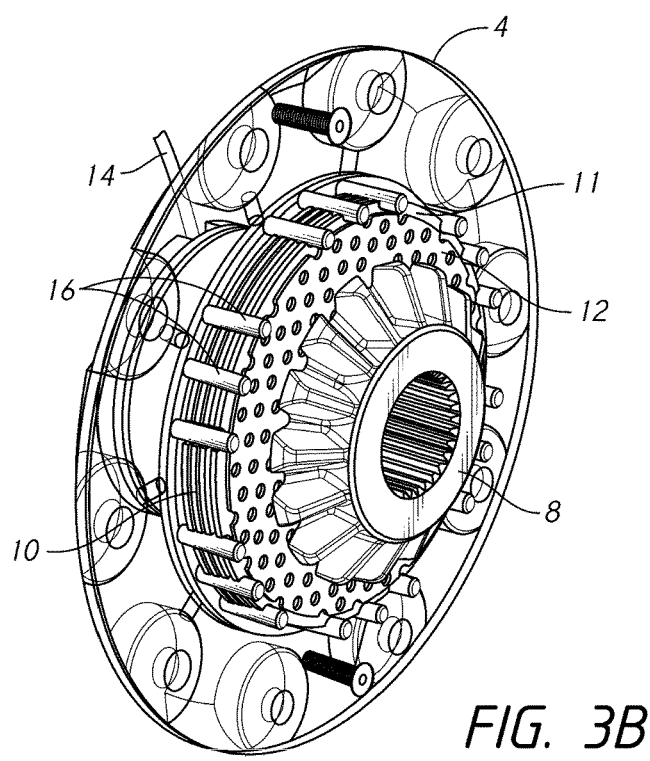
Figure 3C:
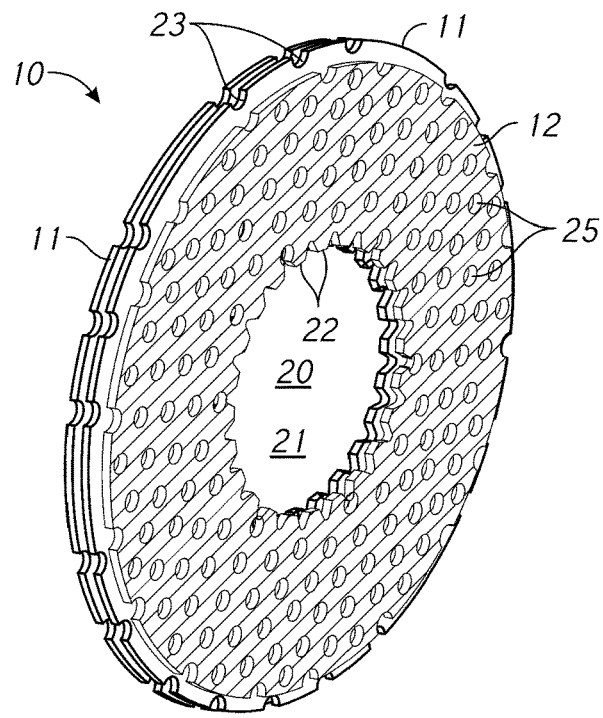
FIG. 3C is a perspective view of a clutch pack.

FIGS. 3A to 3C illustrate disassembling the limited slip differential 1 to access the clutch pack 10.

Figure 4:
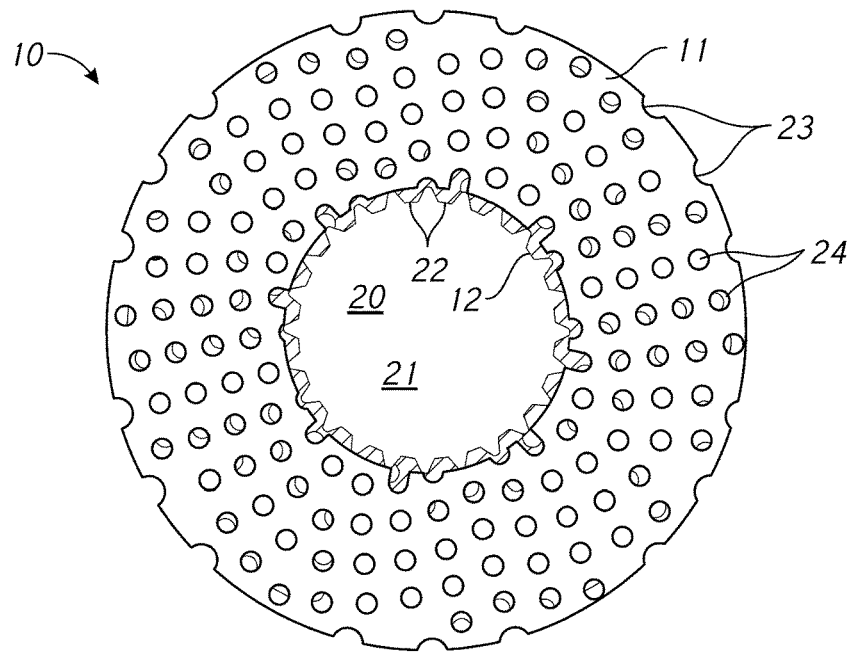
FIG. 4-5C are front views of the clutch pack shown in FIG. 3C.

FIG. 4 is a front view of the clutch pack 10, showing a captive disk 11 overlaying a floating disk 12. Each disk 11, 12 has a central aperture 20, 21 adapted to receive the side gear 8. The central aperture 21 of the floating disk 12 has a plurality of teeth 22 adapted to engage with splines extending from the side gear 8. The captive disks 11 have a peripheral region having a plurality of recesses 23 adapted to receive the spline pins 16 which engage the captive disk 11 with the carrier 2. It will be appreciated that whilst spline pins 16 are used, the carrier 2 may have integral splines (not shown) and the captive disk 11 be adapted to engage directly with the integral splines.

The captive disks 11 and floating disks 12 have a plurality of lubrication apertures 24, 25 arranged therethrough. The lubrication apertures 24, 25 are typically arranged in a plurality of annular arrays at least partially surrounding the respective central aperture 20, 21, and spaced apart radially across a front surface of each disk 11, 12. Alternatively, the apertures 24, 25 are arranged along a spiral extending outwardly from the respective central aperture (not shown). The apertures 24, 25 are arranged such that each aperture 24, 25 through one disk 11, 12 will overlap one or more apertures 24, 25 through an alternative disk 11, 12 when the disks 11, 12 are rotated relative to each other. Typically, the apertures 24, 25 are arranged so that a point on an edge of each aperture 24, 25, relative to a centre of the respective disk 11, 12, is dimensioned a distance from the centre less than or equal to a point on an edge of another aperture through the same disk 11, 12. This means that an aperture 24, 25 is present at every radius dimension of the disk 11, 12, thereby ensuring there is a continuous path of apertures 24, 25 across each disk 11, 12. Whilst the apertures 24, 25 are shown extending through each disk, it will be appreciated that the apertures 24, 25 may only partially extend through each disk (blind apertures). Where blind apertures are employed, the captive disk 11 is arranged having the surface with the blind apertures therein facing the surface of the floating disk 12 having the blind apertures therein.

As the clutch pack 10 is submerged in a lubricant, the lubrication apertures 24, 25 act as reservoirs, containing a volume of lubricant. Also, particulate is typically generated during use of the differential 1 and suspended in the lubricant, which can collect in the clutch pack 10 and wear the surfaces of the disks 11, 12. The suspended particulate is therefore also captured in the apertures 24, 25.

During operation of the differential 1, the differential 1 rotates and generates a centrifugal force which forces lubricant and particulate contained within each aperture 24, 25 radially outwards, away from the common axis. Also, when there is a difference in wheel speed, this causes the disks 11, 12 to rotate relative to each other. As the disks 11, 12 rotate, the apertures 24, 25 pass each other and the centrifugal force moves the lubricant and particulate out of a first aperture 24, 25 in the captive disk 11 and radially outwards into a second aperture 24, 25 in the floating disk 12, which is arranged more distally to the common axis than the first aperture 24, 25. During operation of the differential 1, the process of moving lubricant and particulate between passing apertures 24, 25 in alternating disks 11, 12, is repeated, progressively moving the lubricant and particulate away from the common axis until the lubricant and particulate is expelled away from an outer edge of both disks 11, 12. Furthermore, the oil shear at each aperture 24, 25 also ensures a film of lubricant is distributed evenly across the surface of each disk 11, 12.

The process of circulating lubricant and particulate away from the centre of the disks 11, 12 may involve only three lubrication apertures 24, 25, being an inner aperture 24 arranged proximal to the respective central aperture 20, 21 in one of the captive disk 11 or the floating disk 12, an outer aperture 24 arranged proximal to the peripheral region of the same disk 11, 12, and an intermediate aperture 25 arranged in the adjacent disk 11, 12 between the inner aperture 24 and outer aperture 24.

For example, the captive disk 11 has the inner aperture 24 and the outer aperture 24, and the floating disk 12 has the intermediate aperture 25. As the floating disk 12 rotates relative to the captive disk 11, the lubricant and particulate in the inner aperture 24 is forced radially outwards by the centrifugal force generated by the differential 1. When the intermediate aperture 25 is aligned with and at least partially overlapping the inner aperture 24, the lubricant and particulate pass radially outwards from the captive disk 11 to the floating disk 12 and into the space provided by the intermediate aperture 25. As the floating disk 12 continues to rotate, the lubricant and particulate is again forced radially outwards by the centrifugal force. When the outer aperture 24 is aligned with and at least partially overlapping the intermediate aperture 25, the lubricant and particulate again passes radially outwards from the floating disk 12 to the captive disk 11 and into the space provided by the outer aperture 24. Whilst the above example involves only three apertures 24, 25, it will be appreciated that this process can involve any number of apertures 24, 25 provided that the apertures 24, 25 on the adjacent disks 11, 12 are arranged such that the apertures at least partially overlap at one point during the rotation of the disks 11, 12 relative to each other and therefore lubricant can pass between the disks 11, 12 and progressively away from the centre of the disks 11, 12.

The 'centrifuge effect' created by the arrangement of the apertures 24, 25 is a useful process, as this results in particulate being removed from the clutch pack 10, which reduces the likelihood of damaging the friction disks 11, 12. This also regularly circulates lubricant through the clutch pack 10 to maintain optimum lubrication of the disk 11, 12 surfaces and dissipate heat from the clutch pack 10. Furthermore, due to the optimum lubrication of the disks 11, 12, undesirable 'stick-slip' or 'LSD chatter' characteristics are reduced or eliminated, therefore providing a smoother engagement of the clutch 10 and reducing noise generated by the clutch 10.

Figure 5A:
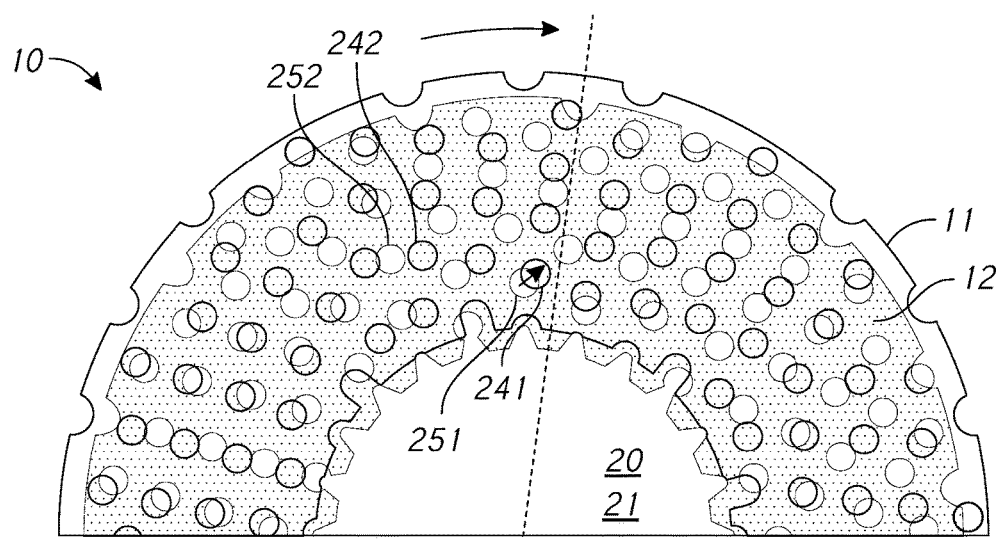
Figure 5B:
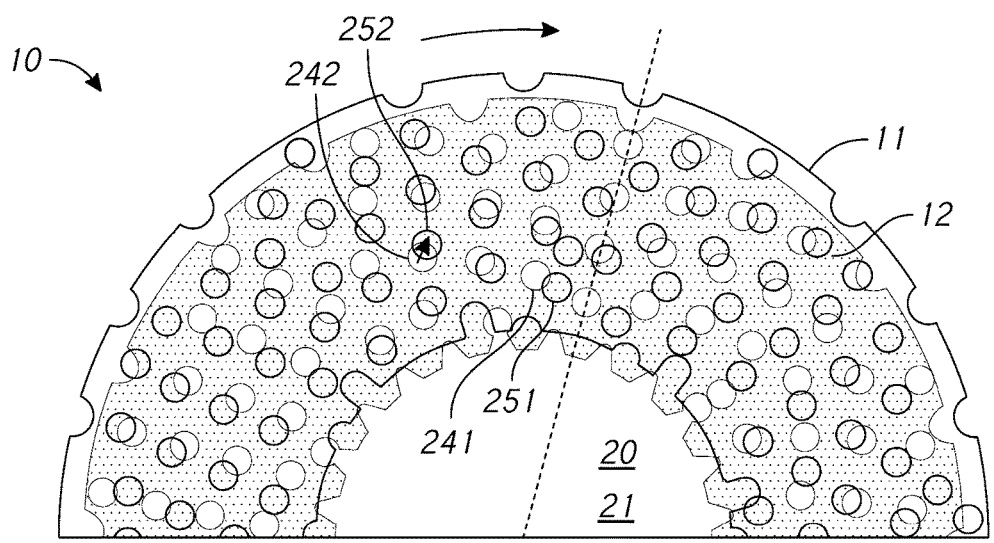

FIGS. 5A and 5B are front cross-section views of the clutch pack 10 illustrating two stages of the disks 11, 12 rotating relative to each other, where the floating disk 12 is shown transparent. The floating disk 11 is shown rotating clockwise relative to the captive disk 12, which remains stationary. Two sets of lubrication apertures 241, 251, 242, 252 are shown passing each other, thereby passing lubricant and particulate radially away from the central apertures 20, 21.

In FIG. 5A, the rotation of the floating disk 12 has aligned a first aperture 251 through the floating disk 12 with a second aperture 241 through the captive disk 11, such that the first aperture 251 overlaps the second aperture 241. As described above, the centrifugal force generated by the differential 1 forces the lubricant and particulate contained in the first aperture 251 radially away from the common axis. When the disks 11, 12 rotate relative to each other, the apertures 251, 241 pass and the centrifugal force moves the lubricant and particulate out of the first aperture 251 and into the second aperture 241, as indicated by the arrow. In this way, lubricant and particulate is passed from the floating disk 12 to the captive disk 11 and away from the common axis.

In FIG. 5B, the rotation of the floating disk 12 has aligned a third aperture 242 through the captive disk 11 with a fourth aperture 252 through the floating disk 12, such that the apertures 242, 252 overlap. Again, as the apertures 242, 252 pass each other, the centrifugal force moves the lubricant and particulate out of the third aperture 242 and into the fourth aperture 252, as indicated by the arrow. This moves lubricant and particulate in an alternative motion to the movement shown in FIG. 5A, as the lubricant and particulate pass from the captive disk 11 to the floating disk 12, and also away from the common axis.

As the disks 11, 12 rotate relative to each other, the steps shown in FIGS. 5A and 5B are repeated by apertures 24, 25 cooperating across the width of both disks 11, 12, thereby moving lubricant and particulate away from the common axis until it is expelled away from an outer edge of both disks 11, 12.

Figure 5C:
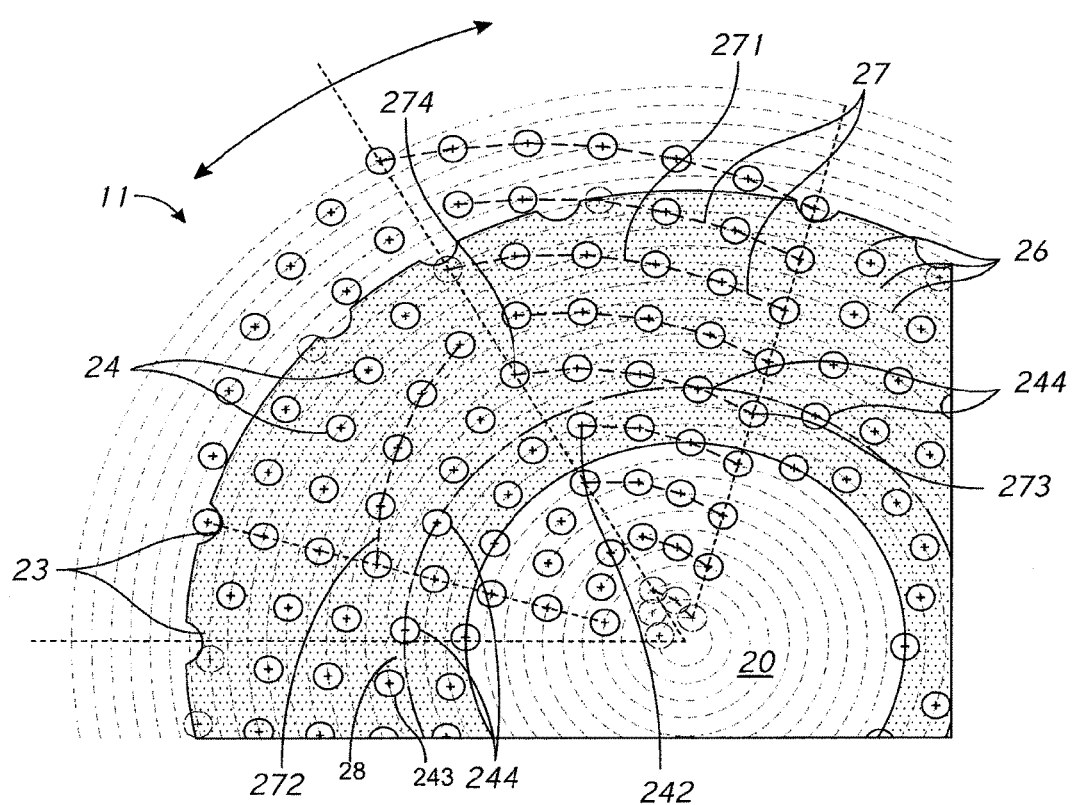

FIG. 5C is front detailed view of the captive disk 11 showing the aperture 24 arrangement. The apertures 24 are arranged in one of thirteen annular regions 26, forming thirteen respective annular arrays. The radial spacing of the annular regions 26 may be determined by arcs 27 extending across several adjacent arrays, with the intersection of each arc 27 and each annular region 26 defining the position of an aperture 24, and therefore each arc 27 defines the arrangement of a group of apertures 24. The groups are repeated in regular segments around the disk 11 to form a repeated pattern.

The geometry of the arcs 27 is determined by the desired frequency of overlapping apertures 24, 25 for adjacent disks 11, 12, with the angle and curvature of the arc 27 affecting the radial spacing of the apertures 24 and the number of apertures 24. The arcs 27 are also formed in a direction relative to a direction of travel of the disks 11, 12. At least one arc 271 is arranged to extend radially outwards and away from a first direction of travel, forming a group of apertures 24 which gradually extend radially outwards away from the centre of the disk 11 across the gentle curve of the arc 271. Similarly, at least one arc 272 is arranged to extend radially outwards and away from a second direction of travel. Each arc 27 has an inner point 273 which intersects with a first annular region 26 arranged proximal to the central aperture 20, and an outer point 274 which intersects with a second annular region 26 arranged distally from the central aperture 20, and also intersects with several other annular regions 26 between the first and second region 26. This arrangement assists lubricant and particulate being passed from one aperture 24, to another 25 when the disks 11, 12 rotate relative to each other. Whilst the disk 11 is shown with thirteen annular arrays, it will be appreciated that this is merely an example, and that the disk 11 may have more or less arrays, depending on the requirements of the clutch pack 10.

The apertures 24 are typically arranged such that each aperture 24 is tangential to a notional circle arranged concentric to the centre of the disk (or the central aperture 20), and the notional concentric circle is coincident with at least one point on another aperture 24. For example, aperture 243 is tangential with notional concentric circle 28, which also coincides with two points on each of apertures 244. This dimensional relationship between apertures 243, 244 ensures there is no continuous annular web present across the surface of the disk 11. When the disk 11 is rotated, the geometry of the apertures 24 therefore ensures a continuous path is provided across the disk 11 for lubricant to travel across. Whilst the captive disk 11 is shown, it will be appreciated that the floating disk 12 has a similar or identical aperture 25 arrangement, and therefore provides the same effect.

Figure 6A:
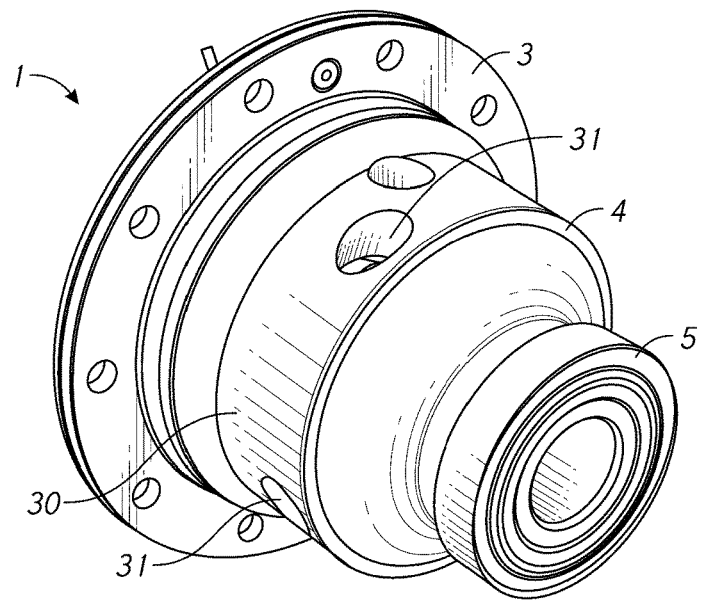
FIG. 6A is an alternative perspective view of the limited slip differential shown in the previous figures.
Figure 6B:
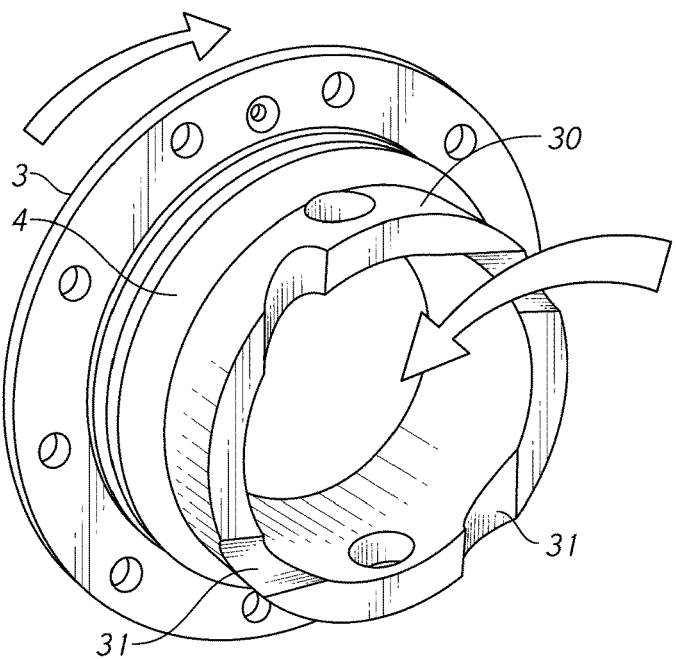
FIG. 6B is a perspective cross-section view of a carrier.

FIG. 6A is a perspective view of the limited slip differential 1 and FIG. 6B is the same view showing the carrier 2 in isolation and cross-section. The carrier 2 has a sidewall 30 extending along the common axis. At least one inlet aperture 31 extends through the sidewall 30 at an angle to an outer surface of the sidewall 30. A centreline of each inlet aperture 31 forms an acute angle with a radius extending between the common axis and an intersection of the centre line and the sidewall. The inlet aperture 31 may extend substantially tangentially to the outer surface 30. Alternatively, as shown in FIG. 6A, the aperture 31 extends substantially tangentially to an internal surface of the sidewall 30.

When the vehicle is travelling forwards, the carrier 2 rotates in a clockwise direction about the common axis. The inlet aperture 31 is arranged to form an acute angle with the direction of rotation of the carrier 2, thereby the sidewalls of the aperture 31 forming a sharp edge which impels lubricant into each aperture 31 as the carrier 2 rotates. The impelling force forms a positive pressure, lubricant rich zone in the centre of the carrier 2. The positive pressure forces the lubricant outwards from the centre of the carrier 2 towards the clutch pack 10, where it is drawn through the clutch pack 10 due to the centrifuge effect described above. The combination of the inlet apertures 31 and lubrication apertures 24, 25 through the clutch pack 10 thereby maintain a constant flow of lubricant through the differential, further assisting with heat dissipation and removal of particulate.

Figure 7A:
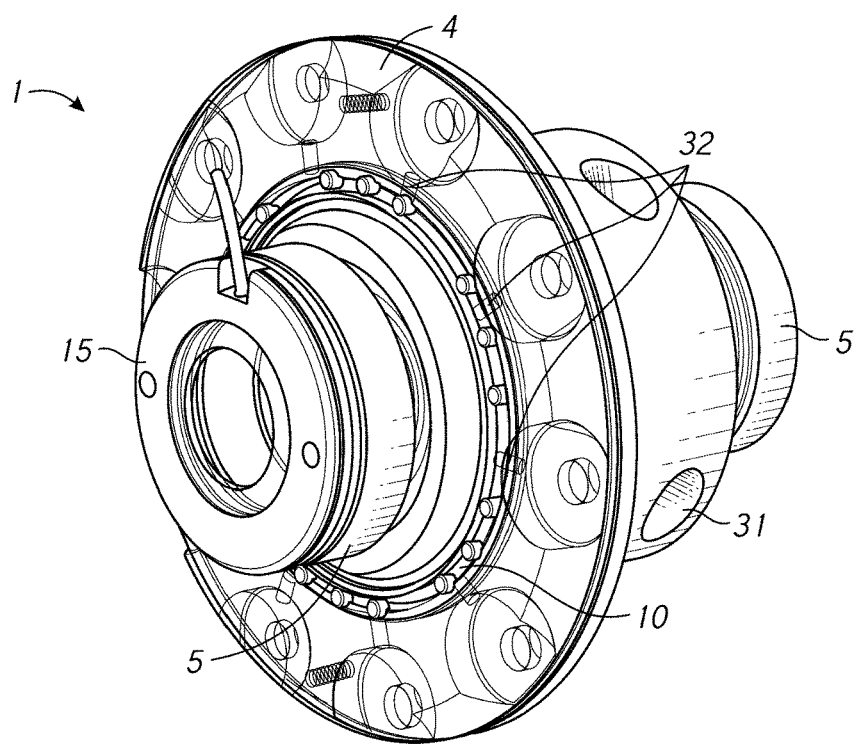
FIG. 7A is an alternative perspective view of the limited slip differential shown in the previous figures.
Figure 7B:
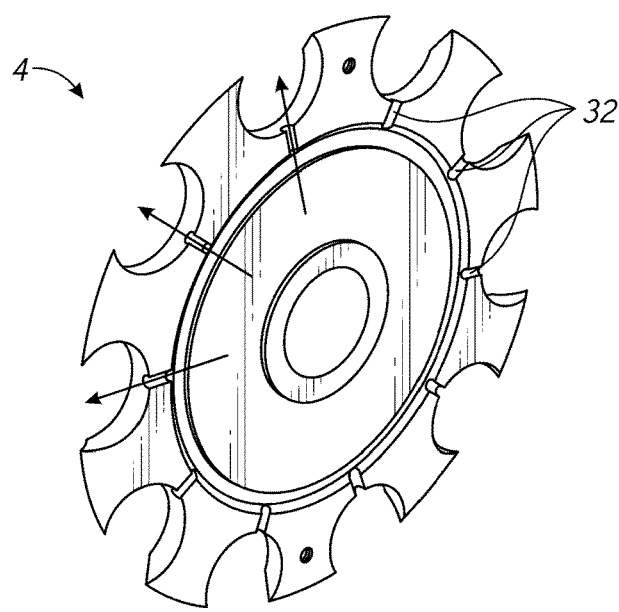
FIG. 7B is a perspective cross-section view of the carrier shown in FIG. 6B.

FIG. 7A is an alternative perspective view of the limited slip differential 1 with the carrier flange 4 shown transparent, and FIG. 7B shows the carrier flange 4 in cross-section. To further assist with the flow of lubricant through the differential 1, the flange 4 has at least one outlet aperture 32 extending from a position proximal to an outer edge of the clutch pack 10 to an area external to the carrier 2. As the carrier 2 rotates, this creates a negative pressure region proximal to an entrance of each aperture 32, thereby urging lubricant and particulate to flow from the clutch pack 10 through the outlet aperture 32 and to the area surrounding the carrier 2, where the particulate can be collected and removed from the lubricant, such as by a plurality of magnets (not shown). The outlet apertures 32 are typically arranged in at least one radial array about the common axis and may extend substantially perpendicular to the common axis. Furthermore, dimensioning the apertures 32 to be relatively small assists creating the negative pressure region. Whilst a single array of outlet apertures 32 is shown in FIGS. 7A and 7B, it will be appreciated that further arrays may be provided to increase the volume of lubricant able to flow therethrough.

Figure 8A:
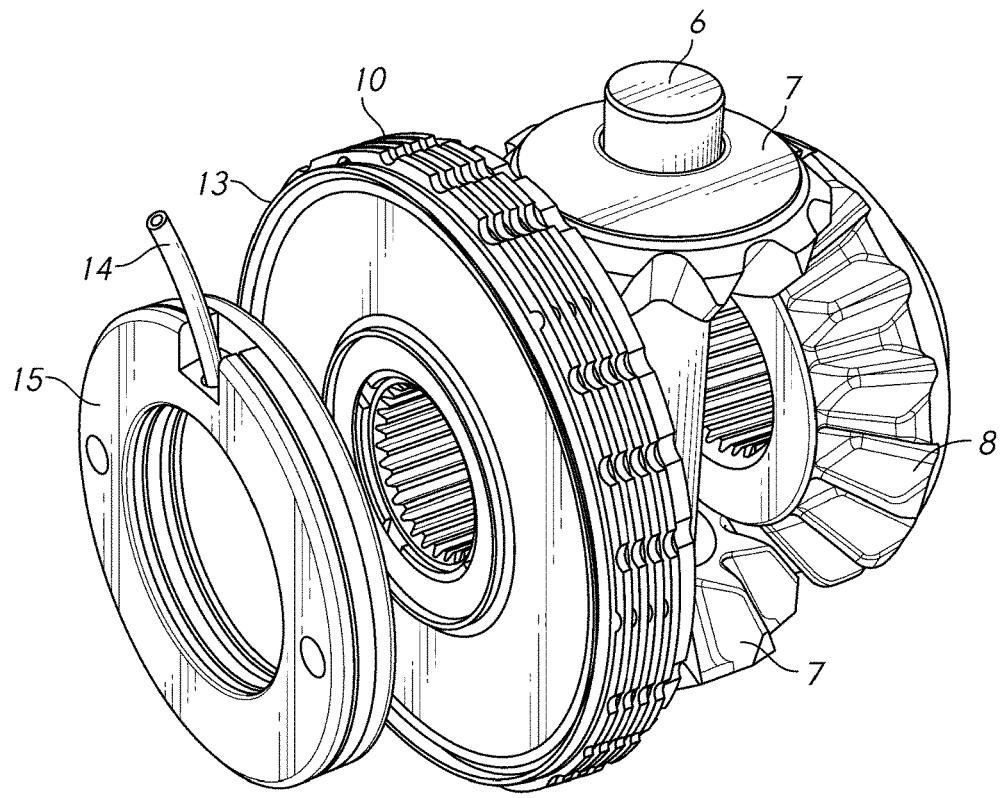
FIG. 8A is a perspective view of some of the components of the limited slip differential shown in the previous figures.

FIG. 8A is a perspective view of part of the differential 1. The piston 13 is arranged against the clutch pack 10 within a complementary chamber in the carrier 2 (not shown). When pressurised fluid flows through the tube 14, seal housing 15 and fluid path, the fluid presses against a rear surface 40 of the piston 13 and urges the piston 13 against the clutch pack 10, to operate the clutch 10. At least a front surface 40 of the piston 13 is deformable in order to conform to imperfections or variations in a surface of a friction disk 11, 12 the piston 13 contacts, thereby acting as a diaphragm or bladder to evenly apply force across the surface of the disk 11, 12. Whilst such imperfections may be in the order of microns, it is important that the piston 13 deforms over any imperfections to avoid creating localised high force regions which would disperse lubricant and likely increase wear on the disk 11, 12. This is particularly important in view of the high torque which needs to be applied to 'lock' the clutch 10, which is typically in the order of 1000s Nm. The piston 13 is shown as a single, annular piston 13 surrounding the common axis however it will be appreciated that the piston 13 may be configured to only partially surround the axis, or may be configured as a plurality of smaller pistons (not shown) around the axis, commonly known as a 'multi-pot' caliper arrangement.

Figure 8B:
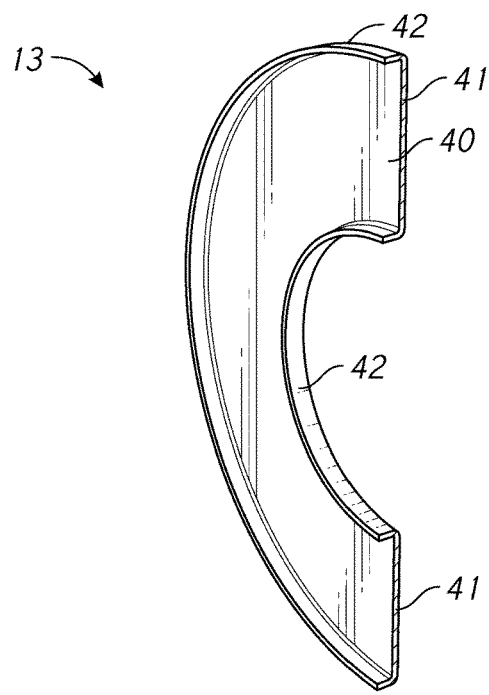
FIG. 8B is a perspective cross-section view of a piston.

FIG. 8B shows a cross-section view of the piston 13, illustrating the U-shaped cross-section 41 of the piston 13. The piston 13 is typically formed from very thin, flexible material, such as sheet metal. When actuated by the working fluid, the U-shaped section causes outside edges 42 of the piston 13 to press against associated seals in the complementary chamber in the carrier 2, enhancing the seal between the piston 13 and the carrier 2, whilst allowing the rear face 40 (and opposing front face) to deform over any surface imperfections in the disk 11, 12. Alternatively, the piston 13 has integral seals (not shown) arranged around at least a peripheral edge thereof.

Figure 9A:
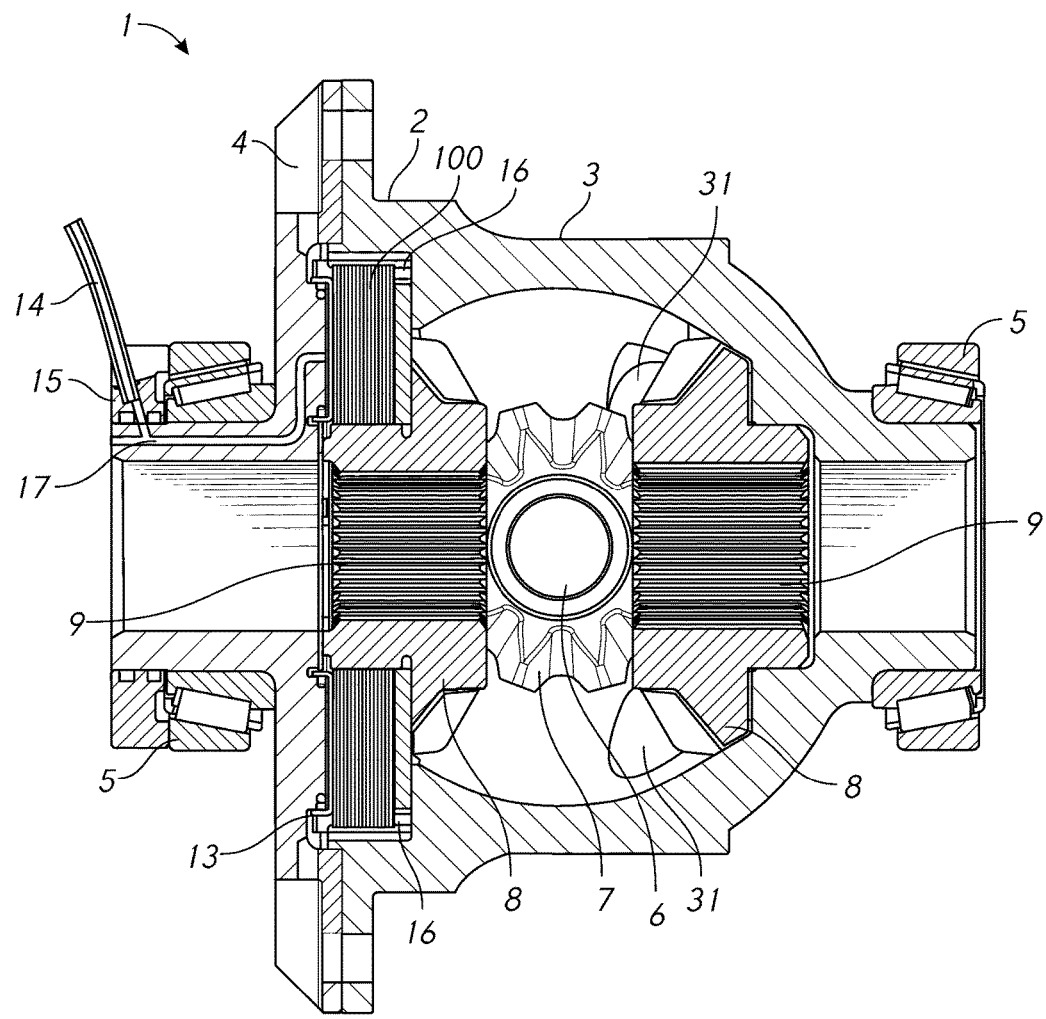
FIGS. 9A-9C are cross section views of the limited slip differential shown in the previous figures having an alternative clutch pack.
Figure 9B:
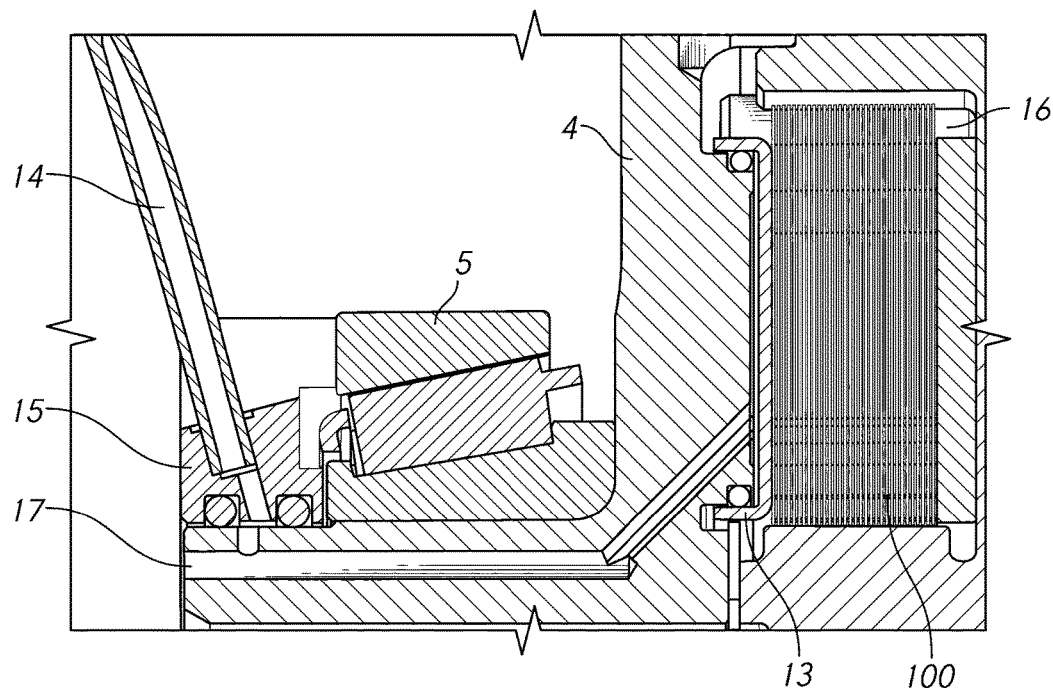
Figure 9C:
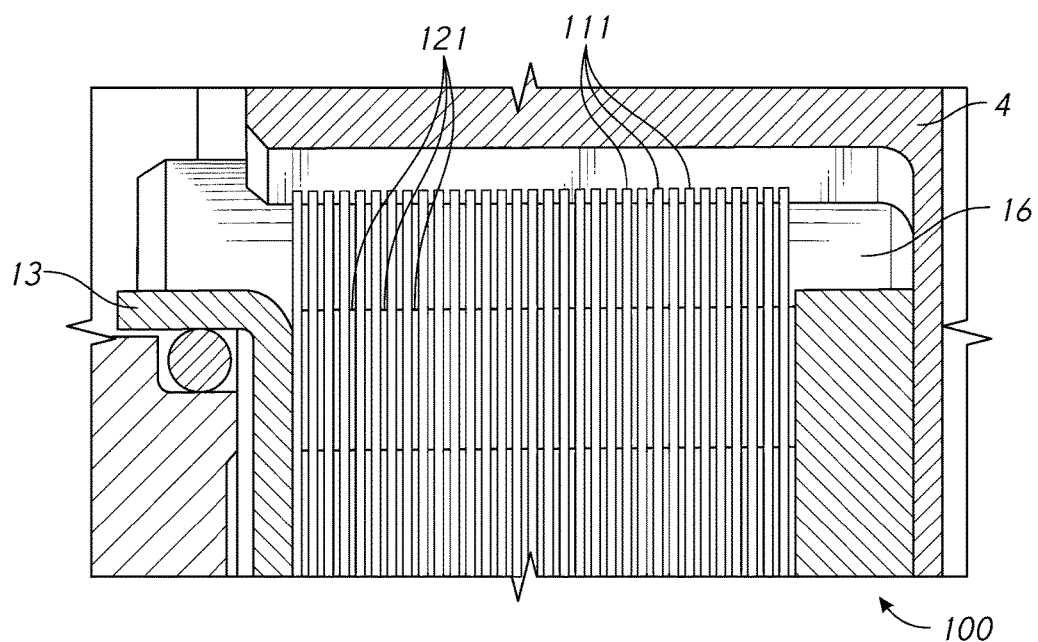

FIGS. 9A-9C are cross-section views of the differential 1 having an alternative clutch pack 100 arranged therein. FIGS. 9B and 9C are detailed views of the clutch pack 100. The alternative clutch pack 100 comprises a plurality of frictions disks 111, 121 arranged in alternating pairs, where each pair comprises a captive disk 111 engaged with the carrier 2 and a floating disk 121 engaged with the side gear 8. In order to handle the substantial torque values passed through the clutch pack 100, there are considerably more pairs of disks 111, 121 than would be found in a conventional limited slip differential clutch pack. For example, conventional clutches typically have 10 pairs, whereas the clutch pack 100 comprises 20 or more pairs of disks 111, 121, and may comprises 30 or more pairs. Furthermore, each disk 111, 121 is a laminar disk, and therefore substantially thinner than conventional limited slip differential friction disks. For example, conventional friction disks are typically around 1.5 mm thick, whereas the laminar disks 111, 121 are around 0.2-0.5 mm thick.

It will be apparent that obvious variations or modifications may be made which are in accordance with the spirit of the disclosure and which are intended to be part of the disclosed principles, and any such obvious variations or modifications are therefore within the scope of the disclosure.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. A limited slip differential for a vehicle comprising:
   a carrier rotatable about a first axis and configured to contain lubricant;
   a pinion gear arranged within the carrier and rotatable about a second axis arranged perpendicular to the first axis;
   a side gear arranged within the carrier and rotatable about the first axis, the side gear engaged with the pinion gear; and
   a clutch pack arranged within the carrier and rotatable about the first axis, the clutch pack comprising a captive disk engaged with the carrier, and a floating disk arranged adjacent the captive disk and engaged with the side gear;
   each of the captive disk and the floating disk having a central region, a peripheral region, and defining at least one lubrication aperture for containing a volume of the lubricant,
   wherein one of the captive and the floating disk has a first face defining a first lubrication aperture proximal to the central region, and defining a second lubrication aperture spaced radially apart from the first lubrication aperture and proximal to the peripheral region, and
   wherein the other disk has a second face arranged opposite the first face, the second face having two notional profiles projected thereon, the notional profiles corresponding with the first lubrication aperture and the second lubrication aperture, and the second face defining an intermediate lubrication aperture spaced radially apart from the central region between the notional profiles, and
   wherein a first notional circle arranged on the second face and concentric with the central region is tangential with the intermediate lubrication aperture and intersects the first lubrication aperture notional profile, and a second notional circle arranged on the second face and concentric with the central region is tangential with the intermediate lubrication aperture and intersects the second lubrication aperture notional profile, and
   wherein, in use, the carrier is at least partially filled with lubricant and the disks rotate relative to each other so that the intermediate lubrication aperture rotates past and partially overlaps the first lubrication aperture causing a volume of the lubricant contained in the first lubrication aperture to move into the intermediate lubrication aperture, and the intermediate lubrication aperture rotates past and partially overlaps the second lubrication aperture causing the volume of the lubricant contained in the intermediate lubrication aperture to move into the second lubrication aperture, thereby causing the lubricant to travel progressively from the central regions towards the peripheral regions via each of the lubrication apertures.

2. The limited slip differential according to claim 1, wherein the first face further defines a third lubrication aperture spaced radially apart from the second lubrication aperture and proximal to the peripheral region, and the second face has a further notional profile projected thereon corresponding with the third lubrication aperture, the second face defining a further intermediate lubrication aperture spaced radially apart from the central region between the second lubrication aperture notional profile and the third lubrication aperture notional profile, and wherein a third notional circle arranged on the second face and concentric with the central region is tangential with the further intermediate lubrication aperture and intersects the second lubrication aperture notional profile, and a fourth notional circle arranged on the second face and concentric with the central region is tangential with the further intermediate lubrication aperture and intersects the third lubrication aperture notional profile, and
   Wherein, in use, the disks rotates relative to each other so that the further intermediate lubrication aperture rotates past and partially overlaps the second intermediate lubrication aperture causing the volume of the lubricant contained in the second lubrication to move into the further intermediate lubrication aperture, and the further intermediate lubrication aperture rotates past and partially overlaps the third lubrication aperture causing the volume of the lubricant contained in the further intermediate lubrication aperture to move into the third lubrication aperture.

3. The limited slip differential according to claim 1, wherein each of the captive disk and the floating disk define a plurality of the lubrication apertures spaced radially apart thereacross such that each lubrication aperture partially overlaps at least two lubrication apertures defined in the adjacent disk when the disks rotate relative to each other.

4. The limited slip differential according to claim 3, wherein a further notional circle is arranged on one of the first and second faces to be concentric with the respective central region and tangential to one of the lubrication apertures defined therein is coincident with at least one point on another lubrication aperture defined in the face.

5. The limited slip differential according to claim 3, wherein each of the lubrication apertures are arranged along a spiral extending radially away from the respective central region.

6. The limited slip differential according to claim 3, wherein at least some of the lubrication apertures are arranged relative to each other in a group, and wherein a plurality of like groups is defined in a repeated pattern about the respective central region.

7. The limited slip differential according to claim 6, wherein each group comprises a plurality of lubrication apertures arranged along an arc extending radially outwards relative to the respective central region.

8. The limited slip differential according to claim 7, wherein the clutch pack is configured to rotate in a first direction, and wherein the arc is arranged to extend away from the first direction.

9. The limited slip differential according claim 1, wherein the clutch pack further comprises a plurality of the first lubrication apertures, a plurality of the second lubrication apertures, and a plurality of the intermediate lubrication apertures, each plurality of lubrication apertures arranged in an annular array.

10. The limited slip differential according to claim 9, wherein each of the annular arrays at least partially surround the respective central region.

11. The limited slip differential according to claim 1, wherein each of the lubrication apertures extends through the respective disk.

12. The limited slip differential according to claim 1, further including a piston arranged adjacent the clutch pack and having a front surface comprising a deformable membrane arranged to abut and conform to one of the captive disk and the floating disk, the piston being movable axially along the first axis to press against the clutch pack, whereby operation of the piston increases pressure within the piston, causing the front surface to abut the clutch pack and deform the deformable membrane, thereby evenly applying pressure across the abutting disk.

13. The limited slip differential according to claim 1, wherein
the carrier has a sidewall extending along the first axis and defines at least one inlet aperture extending therethrough, the at least one inlet aperture having a centre line arranged at an acute angle relative to a radius extending from the first axis to an intersection of the centre line and the sidewall
wherein the carrier further defines at least one outlet aperture extending between a region adjacent to and spaced apart from an outer edge of the clutch pack and an area outside of the carrier; and
wherein, in use, the carrier is at least partially submerged in lubricant and rotates to cause the lubricant to be impelled through the at least one inlet aperture towards the first axis, and cause the lubricant to be expelled through the at least one outlet aperture and away from the first axis.

14. The limited slip differential according to claim 13, wherein the at least one outlet aperture is arranged substantially perpendicular to the first axis.

15. The limited slip differential according to claim 13, wherein the carrier comprises a plurality of the inlet apertures arranged in an annular array about the first axis.

16. The limited slip differential according to claim 13, wherein the at least one inlet aperture extends substantially tangentially from an internal surface of the sidewall.

17. The limited slip differential according to claim 13, wherein the carrier comprises a plurality of the outlet apertures arranged in an annular array about the first axis.

18. A limited slip differential for a vehicle comprising:
a carrier rotatable about a first axis and configured to contain a lubricant;
a pinion gear arranged within the carrier and rotatable about a second axis arranged perpendicular to the first axis;
a side gear arranged within the carrier and rotatable about the first axis, the side gear engaged with the pinion gear;
a clutch pack arranged within the carrier and rotatable about the first axis, the clutch pack comprising a captive disk engaged with the carrier, and a floating disk arranged adjacent the captive disk and engaged with the side gear; and
a piston formed from a flexible material and arranged adjacent the clutch pack and having a front surface acting as a deformable membrane arranged to abut and to conform to one of the captive disk and the floating disk, the piston being movable axially along the first axis to press against the clutch pack,
whereby operation of the piston increases pressure within the piston, causing the front surface to abut the clutch pack and deform to evenly apply pressure across the abutting disk.

19. The limited slip differential according to claim 18, wherein the piston is an annular piston at least partially surrounding the first axis.

20. The limited slip differential according to claim 18, wherein the piston has a U-shaped cross-section.

21. The limited slip differential according to claim 18, wherein the piston comprises integral seal portions arranged around at least a peripheral region thereof.

22. The limited slip differential according to claim 18, wherein each of the captive disk and the floating disk has a central region, a peripheral region, and defines at least one lubrication aperture for containing a volume of the lubricant, wherein one of the captive and the floating disk has a first face defining a first lubrication aperture proximal to the central region, and defining a second lubrication aperture spaced radially apart from the first lubrication aperture and proximal to the peripheral region, and wherein the other disk has a second face arranged opposite the first face, the second face having two notional profiles projected thereon, the two notional profiles corresponding with the first lubrication aperture and the second lubrication aperture, and the second face defining an intermediate lubrication aperture spaced radially apart from the central region between the notional profiles, and wherein a first notional circle arranged on the second face and concentric with the central region is tangential with the intermediate lubrication aperture and intersects the first lubrication aperture notional profile, and a second notional circle arranged on the second face and concentric with the central region is tangential with the intermediate lubrication aperture and intersects the second lubrication aperture notional profile, and wherein, in use, the carrier is at least partially submerged in and filled with lubricant and the disks rotate relative to each other so that the intermediate lubrication aperture rotates past and partially overlaps the first lubrication aperture, causing a volume of the lubricant contained in the first lubrication aperture to move into the intermediate lubrication aperture, and the intermediate lubrication aperture rotates past and partially overlaps the second lubrication aperture, causing the volume of the lubricant contained in the intermediate lubrication aperture to move into the second lubrication aperture, thereby causing the lubricant to travel progressively from the central regions towards the peripheral regions via each of the lubrication apertures.

23. The limited slip differential according to claim 18, wherein the carrier further includes a sidewall extending along the first axis and at least one inlet aperture extending therethrough, the at least one inlet aperture having a centre line arranged at an acute angle relative to a radius extending from the first axis to an intersection of the centre line and the sidewall, and at least one outlet aperture extending between a region adjacent to and spaced apart from an outer edge of the clutch pack and an area outside of the carrier, wherein, in use, the carrier is at least partially submerged in lubricant and rotates to cause the lubricant to be impelled through the at least one inlet aperture towards the first axis, and cause the lubricant to be expelled through the at least one outlet aperture and away from the first axis.

\* \* \* \* \*